Sept. 1, 1925.
G. KNEUPER
WATER FOUNTAIN
Filed March 23, 1925
1,551,572
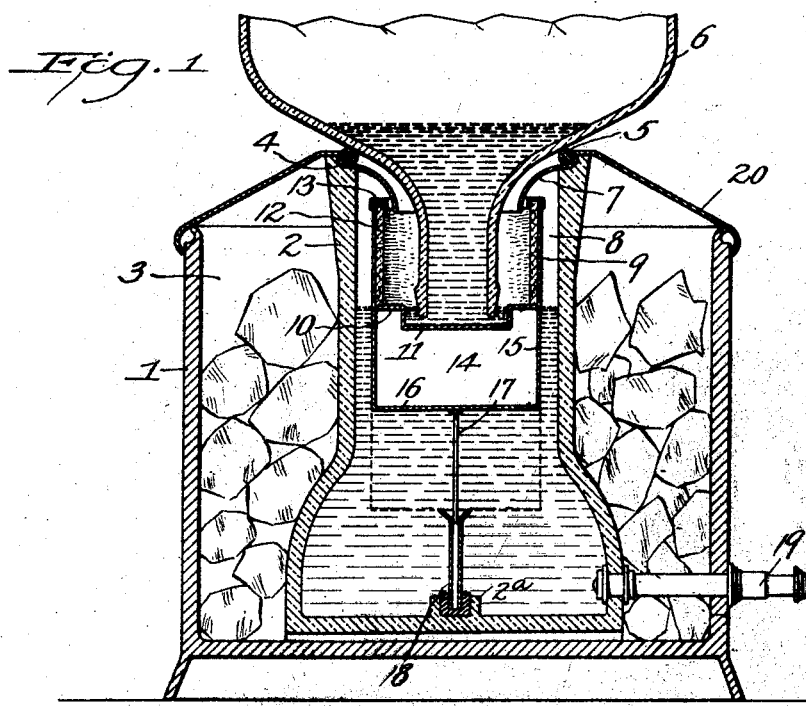
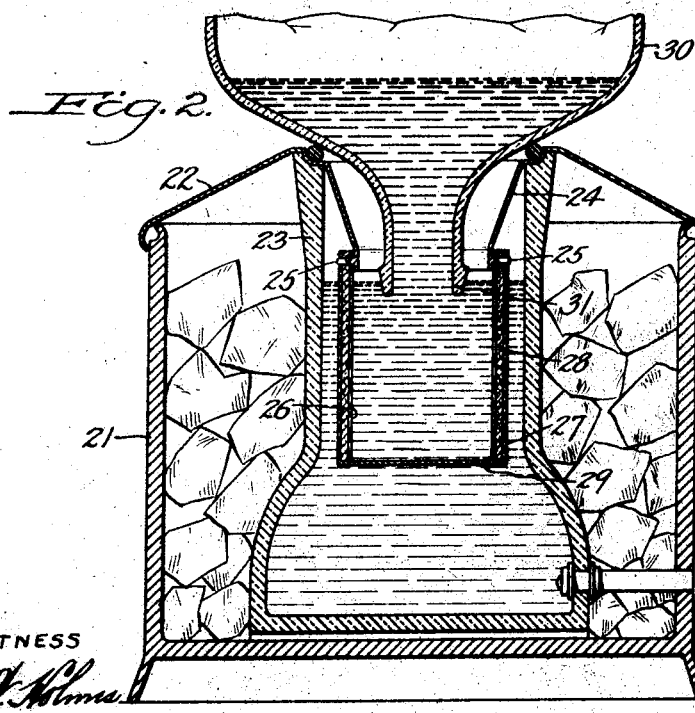
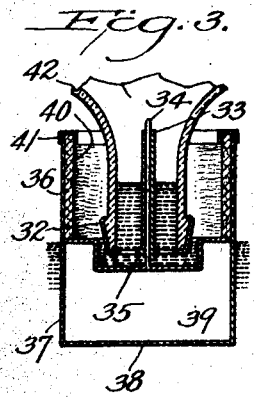
WITNESS
INVENTOR
GEORGE KNEUPER
ATTORNEYS Patented Sept. 1, 1925.

1,551,572

UNITED STATES PATENT OFFICE.

GEORGE KNEUPER, OF NEW YORK, N. Y., ASSIGNOR TO THE FILTRINE MANUFACTURING COMPANY, OF BROOKLYN, NEW YORK, A CORPORATION OF NEW YORK.

WATER FOUNTAIN.

Application filed March 23, 1925. Serial No. 17,505.

*To all whom it may concern:*

Be it known that I, GEORGE KNEUPER, a citizen of the United States, residing in the city of New York, county of Kings, and State of New York, have invented certain new and useful Improvements in Water Fountains, of which the following is a specification.

This invention relates to filtered water receptacles of the type commonly employed for drinking fountains into which the drink-water is discharged under its own gravity from a replaceable container arranged above the water jar of said fountain.

In connection with water fountains of this character, a demand has arisen for the filtration and purification of the water, especially where the water is to be used for drinking purposes. Heretofore, this object has been effected only by filtering and purifying the water before the bottles were filled.

The object of my invention is to provide an improved construction, combination and arrangement of parts in a device of this character whereby the water may be filtered and purified subsequently to its discharge from the replaceable container instead of prior to the container-filling operation as heretofore.

One of the objects of the present invention is to provide an improved filter construction for inverted bottle water fountains whereby a practicable amount of water may be supplied thru a filter approximately as fast as it is drawn from the crock.

Another object of my invention is to provide a water fountain of improved construction which avoids the submergence of the filter in water that has already been filtered.

The importance of filtering the water after it leaves the replaceable container instead of prior to filling said container, will be apparent when attention is called to the fact that water is permitted to flow from the inverted container into the water jar of the fountain, only by the admission of an approximately equal volume of air to said container. This air which bubbles up through the body of water in said container, comes from the surrounding atmosphere and contains under the most favorable conditions 400,000 floating particles of matter per cubic foot commonly called dust. This dust naturally contains the exhalations from those living in the surrounding atmosphere and in consequence pollutes the water as has been demonstrated repeatedly. Thus, any five gallon bottle which has been previously filled with chemically pure water and then mounted on the conventional water cooling drinking fountain, may be shown to contain from fifty thousand to three hundred thousand bacteria per cubic centimeter of water after one-third of the water has been withdrawn therefrom. Naturally this water pollution is cumulative so that the last of the bottled water drawn from such coolers may well be worse than that coming from any public water supply. Moreover, there is great multiplication of bacteria under these conditions, due to the fact that the bottle stands in a temperature most favorable to bacteria development.

Preferably, the filter should be installed in such a way that the filtering material will not be submerged in the water already filtered since the effects produced by dialysis, diffusion, transfusion, etc. will impair the quality of the filtrate. Such considerations may be taken care of according to my invention by the embodiments shown in Figures 1 and 3 of the drawings. It may be noted in this connection, that these effects may not be apparent in the clarity of the water so much as in the objectionable taste and odor.

Subsidiary objects of invention will appear in the specification and be pointed out in the appended claims, reference being had to the accompanying drawings which show some possible adaptations of my invention.

In the drawings—

Figure 1 is a vertical section of a preferred embodiment of my invention wherein the filter is prevented from becoming submerged in the water that has been already filtered;

Figure 2 is a similar vertical section of another embodiment of the invention according to a more inexpensive construction; and Figure 3 is a fragmentary vertical section of another embodiment, showing a modification of the floating filter shown in Figure 1.

Referring more particularly to the drawings, in the embodiment shown in Figure 1, my invention is illustrated in its adaptation to an inverted bottle type of water cooler. According to this embodiment, a metal ice container 1 is adapted to receive a cooling jar or crock 2 which is substantially of carafe shape and which when disposed within the container 1 is adapted to form an annular chamber 3 for a refrigerant which in this instance is ice and water derived therefrom. The cooling jar 2 is provided with an inwardly presented annular recess 4 of the usual construction for the reception of a rubber gasket or packing ring 5 which is usually employed for supporting the inverted bottle or container 6. According to this embodiment of my invention, however, an inwardly and downwardly contracted cape or apron 7 has its flared upper edge seated within the annular recess 4 and beneath the rubber gasket 5. The purpose of the cape or apron 7 is to form a closed wall or partition extending over and above the annular space 8 between the inner surface of the water jar 2 and the outer perforated wall 9 of a filter basket, said filter basket being provided with an imperforate bottom wall comprising an annular portion 10 and a depending cup shaped portion 11 which forms a water holding well around the downwardly presented lip of the bottle or container 6. Within the basket and covering the perforated wall 9 thereof is disposed a cylindrical filter 12, the upper edge of said filter being secured in position by an annular cap 13 which is seated upon the upper edge of the filter basket as well as said filter. According to this embodiment of my invention, the filter is made to rise and fall for making and breaking the water seal at the discharge outlet of the water bottle during the temporary variations of the water surface in the water jar 2 at times when water is being drawn therefrom. For this purpose, suitable means for floating the water filter may be provided by an air chamber 14 formed between the bottom wall of the filter basket and a depending extension of the cylindrical wall of said filter basket comprising an imperforate cylindrical wall 15, and bottom wall 16. Projecting downwardly from the bottom wall 16 is a guide rod 17 adapted to reciprocate in a tubular housing 18 for guiding the filter basket in its upward and downward movements. In order to secure a flexible or yieldable connection between the tubular guide or housing 18 and the bottom wall of crock 2, said bottom wall is provided with an upwardly presented boss or socket 2ª which may, if desired be formed in the crock itself as shown on the drawings. Within the boss or socket 2ª is arranged a plug-like mass of cushioning material such, for example, as soft rubber for mounting said tubular guide or housing 18 at its lower end. This construction affords a measurable protection against breakage by permitting a limited degree of movement to the rod 17 and guide 18 under yieldable constraint. The usual water faucet 19 may be connected to the enlarged lower end of the water jar 2. An annular cover 20 rests around its outer peripheral edge upon the upper edge of the refrigerant container 1 and has its inner annular flange resting upon the upper edge of the water jar 2.

According to the embodiment of my invention shown in Figure 2 the refrigerant holding jar 21 is provided with an annular cover 22 having its inner flange resting upon the upper edge of the water crock 23 which is formed substantially similar to that shown in Figure 1. Suspended within the upper end of the cooling jar 23 is a funnel shaped wall or partition 24 provided at its lower end with radial lugs 25 from which is suspended a cylindrical filter comprising an inner perforated wall 26, an outer perforated wall 27, an interposed filter layer 28, and an imperforate bottom wall 29. The inverted bottle 30 according to this embodiment has its downwardly presented lip 31 centrally disposed within the wall or partition 24 and slightly below the upper edge of the filter.

According to the modification of the floating filter shown in Figure 3, the inverted bottle 42 has a cap or spider 32 secured thereto, said spider carrying an upwardly projecting tubular guide 33 within the neck of said inverted bottle. A guide rod 34 slidably mounted in the tubular guide 33, is mounted on an imperforate bottom wall 35 of the filter basket which is also provided with a perforated cylindrical wall 36. An imperforate extension 37 of the cylindrical wall 36 is closed by a bottom wall 38 to form an air chamber 39. A cylindrical filter mat 40 is arranged within the perforated wall 36 and clamped thereto at the top by an annular cap 41.

Operation.

It will be understood from the foregoing description that whenever water is drawn off from the water jar, the hydrostatic balance is destroyed in such a way as to create a flow of water thru the filter wall into the water jar and breaking the water seal about the mouth of the inverted bottle or container. In the embodiments shown in Figures 1 and 3, the water seal is broken by a downward movement of the floating filter, the balance being reestablished as soon as enough of the water released from the jar has filtered thru the cylindrical wall of the filter. In the embodiment shown in Figure 2 on the other hand, the filtering begins as soon as the water level in the water jar falls sufficiently to create a filtering head of water within the filter cup, the balance being again established by the water released from the inverted bottle.

I claim:—

1. The combination with a water container adapted to discharge by gravity, a receptacle for filtered water, and a filter interposed between said receptacle and said filtered water container and forming a water seal to said water container.

2. The combination with a water fountain comprising a chamber for refrigerant and a chamber for water to be dispensed, said fountain being provided with suitable means for supporting a water container in inverted position, of a filter cup mounted within said water chamber and arranged to receive the water from said inverted container, said filter cup with water therein being adapted to form a water seal for said inverted water container.

3. A water fountain for replaceable inverted water containers, said water fountain having a dispensing water jar, and a floating water filter arranged to receive water from said inverted container and to filter the water as it passes into said water jar.

4. A water fountain for replaceable inverted water containers, said water fountain having a dispensing water jar, and a floating water filter arranged to receive water from said inverted container and to filter the water as it passes into said water jar, said floating filter being adapted by its rise and fall to make and break a water seal over the mouth of said container.

5. In a water fountain, the combination with a refrigerant chamber, of a water holding chamber, and a filter cup reciprocable vertically with the rise and fall of the upper surface of water in said water chamber, said filter cup being adapted to make and break a water seal for controlling the flow of water into said filter cup.

6. In a water fountain provided with a water jar, a water filter cup reciprocable vertically in said water jar, said water filter cup being provided with a depressed well in the bottom wall thereof for holding water to effect a water seal for a downwardly discharging water supply.

7. In a water fountain provided with a water jar, a water filter cup reciprocable vertically in said water jar, said water filter cup being provided with a depressed well in the bottom wall thereof for holding water to effect a water seal for a downwardly discharging water supply, said filter cup being provided with a float chamber adapting it to rise and fall with the surface of the water in said water jar.

8. In a water fountain provided with a water jar, a water filtering receptacle adapted to float upon the filtered water in said water jar, and means for guiding said filtering receptacle during its rising and falling movements, including a flexible connection with said water jar.

9. In a water fountain provided with a water jar, a filter cup arranged to receive and filter water to be deposited in said water jar, said filter cup being adapted to float on the water in said water jar, relatively reciprocable guiding elements carried by said filter cup and water jar respectively, and a cushioning connection interposed between said water jar and the guiding element carried thereby.

10. In a water fountain, a water jar, the bottom wall of said water jar being provided with an upwardly presented boss or socket, a guide element having its lower end cushioned in said boss or socket, a floating filter cup in said water jar, and a guide element carried by said floating filter cup and slidably engaging the guide element mounted in said boss or socket.

11. In a water fountain provided with a water jar, a water filtering receptacle adapted to float upon the filtered water in said water jar, and means for guiding said filtering receptacle during its rising and falling movements.

GEORGE KNEUPER.